United States Patent [19]

Yoshimura et al.

[11] Patent Number: 4,900,926

[45] Date of Patent: Feb. 13, 1990

[54] RADIATION IMAGE READ-OUT APPARATUS

[75] Inventors: Ryoichi Yoshimura; Shumpeita Torii, both of Kanagawa, Japan

[73] Assignee: Fuji Photo Film Co., Ltd., Kanagawa, Japan

[21] Appl. No.: 284,819

[22] Filed: Dec. 14, 1988

Related U.S. Application Data

[63] Continuation of Ser. No. 10,529, Feb. 3, 1987, abandoned.

[30] Foreign Application Priority Data

Feb. 3, 1986 [JP]  Japan ................................. 61-21729

[51] Int. Cl.$^4$ .............................................. G03B 42/08
[52] U.S. Cl. ................................. 250/327.2; 250/484.1
[58] Field of Search ................... 250/327.2 K, 327.2 J, 250/484.1 B

[56] References Cited

U.S. PATENT DOCUMENTS

| | | | |
|---|---|---|---|
| 3,774,902 | 11/1973 | Schulze | 271/293 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,400,619 | 8/1983 | Kotera et al. | 250/327.2 |
| 4,578,582 | 3/1986 | Takano | 250/327.2 |
| 4,678,180 | 7/1987 | Tamura et al. | 271/296 |

FOREIGN PATENT DOCUMENTS 56-11395  2/1981  Japan ................................. 250/327.2

Primary Examiner—Constantine Hannaher
Attorney, Agent, or Firm—Sughrue, Mion, Zinn, Macpeak & Seas

[57] ABSTRACT

A radiation image read-out apparatus comprises a read-out section for reading out a radiation image stored on a stimulable phosphor sheet, an erasing section for erasing radiation energy remaining on the stimulable phosphor sheet after image read-out from the stimulable phosphor sheet is finished, a section for releasably holding a sheet feed cassette capable of housing the image-recorded stimulable phosphor sheet and for taking the stimulable phosphor sheet out of the sheet feed cassette toward the read-out section, and a section for releasably holding a sheet housing cassette capable of housing the stimulable phosphor sheet erased at the erasing section. The apparatus also comprises a sheet stacking section for holding a plurality of erased stimulable phosphor sheets having different sizes, selecting the stimulable phosphor sheet having a desired size one at a time from the stimulable phosphor sheets held at the sheet stacking section, and feeding out the selected stimulable phosphor sheet towards the section for holding the sheet housing cassette.

15 Claims, 7 Drawing Sheets

1

RADIATION IMAGE READ-OUT APPARATUS

This is a continuation of application Ser. No. 010,529, filed Feb. 3, 1987, now abandoned.

BACKGROUND OF THE INVENTION

1. Field of the Invention

This invention relates to a radiation image read-out apparatus for use in a radiation image recording and reproducing system. This invention particularly relates to a radiation image read-out apparatus wherein a read-out section and an erasing section are combined integrally.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

In the proposed radiation image read-out apparatus, a cassette housing a stimulable phosphor sheet carrying a radiation image stored thereon by use of an external image recording apparatus is fed to a cassette holding section, and the stimulable phosphor sheet is taken out of the cassette and sent to the read-out section for reading out the radiation image. After the image read-out is finished, the sheet is sent to the erasing section where radiation energy remaining on the sheet is erased. The erased sheet is taken out of the read-out apparatus and reused for image recording. In general, a plurality of the erased reusable sheets are stacked in a stacking tray inside of the read-out apparatus, and taken out of the read-out apparatus in the form housed in the stacking tray. Since the sheets stacked in the stacking tray should be housed one by one in a cassette as mentioned above when they are to be reused for image recording, it is necessary to load the sheets one by one into a cassette prior to image recording. Therefore, a long time is taken for housing each sheet ready for image recording to a cassette and conducting image recording on the sheet, and it is not always possible to efficiently circulate and reuse the sheet. Also, loading of the sheet into the cassette is carried out by use of a special-purpose loader or manually, but the cost of the overall system is increased when a special-purpose loader is used, and manual loading is disadvantageous from the viewpoint of sheet processing since the sheet is directly handled. The radiation image read-out apparatus may also be constituted so that the sheet is circulated therein, taken out of a cassette after image recording, subjected to image read-out and erasing, and then conveyed and housed in a cassette. However, with such a read-out apparatus, since the read-out apparatus is exclusively occupied by a single sheet until the sheet is housed in the cassette after image read-out and erasing are conducted on the sheet, processing of the next sheet cannot be started as long as processing of the preceding sheet is being conducted. Thus an unnecessarily long time is taken, and the processing capacity of the apparatus decreases markedly.

SUMMARY OF THE INVENTION

The primary object of the present invention is to provide a radiation image read-out apparatus for conducting image read-out and erasing in a single apparatus, and for returning a stimulable phosphor sheet into a cassette inside of the apparatus after image read-out and erasing are conducted on the sheet taken out of the cassette, wherein a plurality of sheets are efficiently circulated and reused by elimination of the problem that the apparatus is exclusively occupied by a single sheet and the sheet processing speed decreases.

Another object of the present invention is to provide a radiation image read-out apparatus for conducting image read-out and erasing in a single apparatus, and for returning a stimulable phosphor sheet into a cassette inside of the apparatus after image read-out and erasing are conducted on the sheet taken out of the cassette, wherein sheet loading to the cassette is conducted smoothly even though a plurality of sheets having different sizes are in use in the apparatus.

The present invention provides a radiation image read-out apparatus comprising:

(i) a read-out section for reading out a radiation image stored on a stimulable phosphor sheet, (ii) an erasing section for erasing radiation energy remaining on said stimulable phosphor sheet after image read-out from said stimulable phosphor sheet is finished, (iii) a sheet feed cassette holding section for releasably holding a sheet feed cassette capable of housing said stimulable phosphor sheet therein, and for taking said stimulable phosphor sheet out of said sheet feed cassette, (iv) a sheet housing cassette holding section for releasably holding a sheet housing cassette capable of housing said stimulable phosphor sheet, (v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and (vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section.

With the radiation image read-out apparatus in accordance with the present invention, since the stimulable phosphor sheet taken out of the sheet feed cassette is loaded into the sheet housing cassette after being passed through the read-out section and the erasing section and stacked at the sheet stacking section 70, loading of the erased reusable sheet into the cassette is finished in the read-out apparatus. Also, since the sheet stacking section is disposed, and the sheet housing cassette and the sheet feed cassette are held respectively at the sheet housing cassette holding section and the sheet feed cassette holding section, it is possible to simultaneously conduct taking-out of the image-recorded sheet from the sheet feed cassette and loading of the erased reusable sheet into the sheet housing cassette. Therefore, the read-out apparatus need not be exclusively occupied by a single sheet, and it becomes possible to circulate and reuse the sheets efficiently. Also, since the sheet stacking section can hold a plurality of the sheets having different sizes and selectively feed out a sheet having a size suitable for the sheet housing cassette held at the sheet housing cassette holding section, it becomes possible to conduct sheet loading smoothly even though the sheets and the cassettes having different sizes are to be processed in the apparatus.

DESCRIPTION OF THE PREFERRED EMBODIMENTS

The present invention will hereinbelow be described in further detail with reference to the accompanying drawings.

Figure 1:
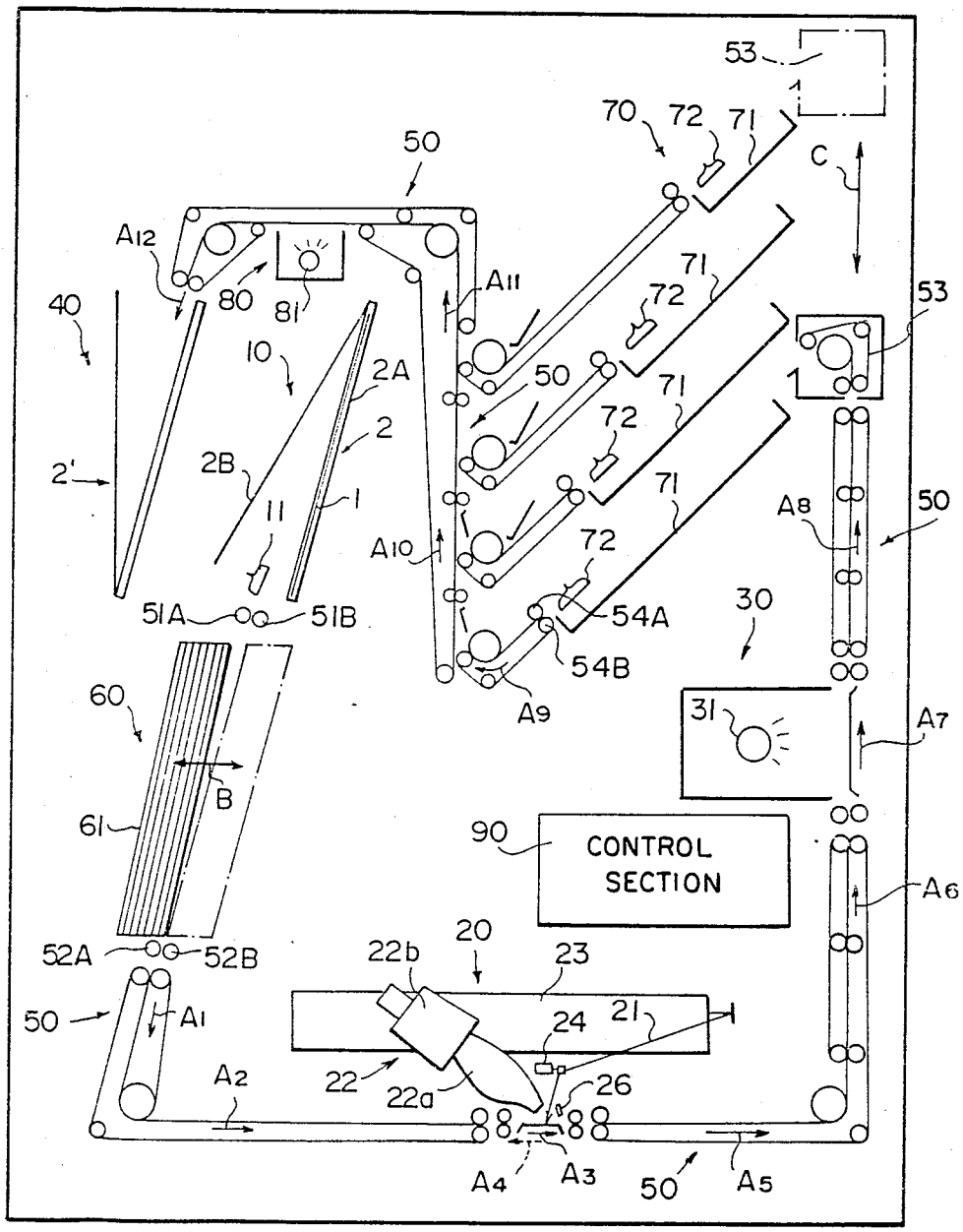
FIG. 1 is a schematic side view showing an embodiment of the radiation image read-out apparatus in accordance with the present invention.

Referring to FIG. 1, an embodiment of the radiation image read-out apparatus in accordance with the present invention is provided with a sheet feed cassette holding section 10 for releasably holding a sheet feed cassette 2 capable of housing a stimulable phosphor sheet (hereinafter simply referred to as a sheet) 1 therein, a read-out section 20 for reading out a radiation image stored on the sheet 1, an erasing section 30 for erasing radiation energy remaining on the sheet 1 after image read-out is conducted thereon, and a sheet housing cassette holding section 40 for releasably holding a sheet housing cassette 2' capable of housing the sheet erased at the erasing section 30. The sheet 1 is subjected to image recording in an external image recording apparatus (not shown) in the form housed in the sheet feed cassette 2, and the sheet feed cassette 2 housing the image-recorded sheet 1 is fed to the sheet feed cassette holding section 10. The sheet feed cassette 2 comprises a cassette body 2A capable of housing the sheet 1 therein and an openable cover member 2B, and is light-tight so that the sheet 1 is prevented from being exposed to external light when it is exposed to a radiation to have a radiation image recorded thereon. After the sheet feed cassette 2 is fed into the sheet feed cassette holding section 10, the cover member 2B is opened as shown, and a suction means 11 disposed inside of the sheet feed cassette holding section 10 advances into the sheet feed cassette 2, sucks up the image-recorded sheet 1 inside the cassette body 2A, and takes the sheet 1 out of the sheet feed cassette 2. The image-recorded sheet 1 is maintained in the sheet feed cassette 2 so that the front surface provided with a stimulable phosphor layer faces down, i.e. faces the side opposite to the side sucked up by the suction means 11. When the sheet 1 is taken out of the sheet feed cassette 2, the sheet feed cassette 2 is taken out of the sheet feed cassette holding section 10, loaded in the sheet housing cassette holding section 40, and used as the sheet housing cassette 2'.

The embodiment of FIG. 1 is provided with a sheet conveyance means 50 comprising endless belts, rollers, guide plates or the like for receiving the image-recorded sheet 1 taken out of the sheet feed cassette 2 as mentioned above, and conveying the sheet 1 to the read-out section 20 and the erasing section 30 in this order. The suction means 11 for sucking up the sheet 1 and taking it out of the sheet feed cassette 2 as mentioned above transfers the sheet 1 to feed-in rollers 51A and 51B disposed in the vicinity of the suction means 11. In this embodiment, a stacker 60 comprising a plurality of trays 61, 61, ... for housing a single sheet 1 respectively is disposed between the sheet feed cassette holding section 10 and the read-out section 20. The stacker 60 temporarily houses the sheet 1 taken out of the sheet feed cassette holding section 10. The sheet 1 grasped between the feed-in rollers 51A and 51B is fed thereby into one of the tray 61, 61, ... of the stacker 60 moveable in the direction as indicated by the arrow B. The upper end portion of the tray 61 for receiving the sheet 1 is opened when the sheet 1 is fed thereinto, and is closed when the sheet 1 has been fed thereinto. When the sheet 1 is to be fed out of the tray 61, the stacker 60 is moved in the direction as indicated by the arrow B until the predetermined tray 61 containing the sheet 1 which should be fed thereout is positioned above feed-out rollers 52A, 52B provided below the stacker 60, and the lower end of the tray 61 is opened to transfer the sheet 1 to the feed-out rollers 52A, 52B. The sheet 1 is then conveyed by the sheet conveyance means 50 in the directions as indicated by the arrows A1 and A2 into the read-out section 20.

At the read-out section 20, the sheet 1 carrying a radiation image stored thereon is scanned with stimulating rays 21 such as a laser beam which cause the sheet 1 to emit light in proportion to the stored radiation energy, and the emitted light is photoelectrically detected by a photoelectric read-out means 22 constituted by a photomultiplier or the like to obtain an electric image signal for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 1 towards a light guide member 22a of the photoelectric read-out means 22. The light guide member 22a guides the light through total reflection therein up to a photodetector 22b constituted by a photomultiplier or the like.

The sheet 1 sent to the read-out section 20 is conveyed by the sheet conveyance means 50 in the direction as indicated by the arrow A3, and the whole surface of the sheet 1 is scanned two-dimensionally by the stimulating rays 21 deflected approximately normal to the conveyance direction. The light emitted by the sheet 1 during the scanning is detected by the photodetector 22b via the light guide member 22a. Image read-out is conducted in this manner.

As for the radiation image read-out, there has heretofore been known a method wherein preliminary read-out for approximately ascertaining the radiation image stored on the sheet 1 is conducted prior to the aforesaid image read-out (final read-out) for obtaining an electric image signal for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the sheet 1 with stimulating rays having stimulation energy of a level lower than the level of the stimulation energy of the stimulating rays used in the final read-out, and detecting the light emitted by the sheet 1 during the scanning by a photoelectric read-out means.

The read-out section 20 may be constituted to conduct only the final read-out or both the preliminary read-out and the final read-out. For example, the preliminary read-out may be conducted by conveying the sheet 1 in the direction as indicated by the arrow A3, and the final read-out may then be carried out by reversely conveying the sheet 1 in the direction as indicated by the arrow A4 to the read-out start position, and then conducting the final read-out while the sheet 1 is again conveyed in the direction as indicated by the arrow A3. The optical members at the read-out section 20 are not limited to those mentioned above. For example, a long photomultiplier may be disposed along the main scanning line as the photoelectric read-out means, and the light emitted by the sheet 1 may be detected thereby without using the light guide member 22a.

Though a comparatively long time is taken for conducting the image read-out at the read-out section 20, since this embodiment is provided with the stacker 60, it is possible to convey the sheets 1, 1, . . . carrying a radiation image stored thereon sequentially into the stacker 60 while image read-out is being conducted for one sheet 1, and thereby to process the sheets 1, 1, . . . very efficiently. It is also possible to preferentially send a specific sheet 1 among the sheets 1, 1, . . . housed in the stacker 60 to the read-out section 20 for preferentially conducting image read-out from the specific sheet 1. The stacker 60 need not necessarily be provided in the case where a sheet feed cassette 2 housing a sheet 1 is always fed to the sheet feed cassette holding section 10 after image read-out from a preceding sheet 1 is finished at the read-out section 20, and the sheet 1 taken out of the sheet feed cassette 2 need not be made to wait prior to sending to the read-out section 20.

After image read-out from the sheet 1 is finished at the read-out section 20, the sheet 1 is conveyed by the sheet conveyance means 50 in the directions as indicated by the arrows A5 and A6 to the erasing section 30.

At the erasing section 30, radiation energy remaining on the sheet 1 after the image read-out is conducted is erased. Specifically, a part of the radiation energy stored on the sheet 1 at the image recording step remains stored thereon after the image read-out is conducted. In order to reuse the sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the sheet 1 is exposed to the erasing light emitted by the erasing light sources 31, 31, . . . for releasing the residual radiation energy from the sheet 1 while the sheet 1 is conveyed in the direction as indicated by the arrow A7. At the erasing section 30, any known erasing method may be used. For example, erasing may be conducted by heating or by a combination of exposure to the erasing light with heating.

After erasing of the sheet 1 is finished at the erasing section 30, the erased sheet 1 is conveyed by the sheet conveyance means 50 in the direction as indicated by the arrow A8 to the sheet stacking section 70. The sheet stacking section 70 comprises trays 71, 71, . . . (by way of example, four trays in this embodiment) having different sizes and disposed in vertically parallel relation to each other, and the erased sheet 1 is fed into one of the trays 71, 71, . . . having a size suitable for the size of the sheet 1. Specifically, a moveable conveyance device 53 is disposed at a portion of the sheet conveyance means 50 in the vicinity of the sheet stacking section 70 for movement in the direction as indicated by the arrow C to selectively face either one of the trays 71, 71, . . . at the sheet stacking section 70. After grasping the leading end portion of the sheet 1 conveyed as mentioned above in the direction as indicated by the arrow A8, the moveable conveyance device 53 is moved from the position indicated by the solid line in FIG. 1 up to the position facing the predetermined tray 71, and conveys the sheet 1 into the predetermined tray 71. In this manner, the trays 71, 71, . . . at the sheet stacking section 70 are sequentially fed with the sheet 1 having a size suitable for each tray.

Also, the sheet stacking section 70 is constituted to select an erased sheet 1 having a size suitable for the sheet holding cassette 2' held at the sheet housing cassette holding section 40 from among the erased sheets, 1, 1, . . . housed in the trays 71, 71, . . . . Each of the trays 71, 71, . . . is provided with a suction means 72 for sucking up the sheet 1 housed in the tray 71 and transferring it to the sheet conveyance mans 50 in the vicinity of the suction means 72. For example, when the sheet 1 is to be fed out of the bottom tray 71, the suction means 72 in the bottom tray 71 sucks up the sheet 1 in the bottom tray 71, and transfers it to feedout rollers 54A and 54B disposed in the vicinity of the suction means 72. The sheet 1 thus fed out of tray 71 is conveyed by the sheet conveyance means 50 in the directions as indicated by the arrows A9, A10 and A11, made to pass over an auxiliary erasing section 80 disposed on the sheet conveyance means 50, and then conveyed in the direction as indicated by the arrow A12 into the sheet housing cassette 2' held at the sheet housing cassette holding section 40. Feeding-out of the erased sheet 1 from the sheet stacking section 70 and loading thereof into the sheet housing cassette 2' are conducted immediately when the image-recorded sheet 1 is taken out of the sheet feed cassette 2 as mentioned above and said sheet feed cassette 2 is fed to the sheet housing cassette holding section 40 to act as the sheet housing cassette 2'. Therefore, into a single cassette which housed the image-recorded sheet 1, and was fed to the read-out apparatus, an erased reusable sheet 1 is loaded inside of the apparatus very quickly after the cassette has been fed to the apparatus. Also, since the sheet feed cassette holding section 10 and the sheet housing cassette holding section 40 are disposed independently of each other, taking-out of the image-recorded sheet 1 from the sheet feed cassette 2 and the loading of the erased reusable sheet 1 into the sheet housing cassette 2' may be conducted simultaneously, and it is possible to increase the sheet circulation and reuse efficiency markedly.

In order to feed out the sheet 1 having a size suitable for the sheet housing cassette 2' from the sheet stacking section 70, it is necessary to maintain in advance a plurality of the sheets 1, 1, . . . having different sizes at the sheet stacking section 709. In order to maintain the sheets 1, 1, . . . having different sizes in advance at the sheet stacking section 70, they may be collected into the sheet stacking section 70 without conducting sheet feeding-out therefrom for a while after the operation of the read-out apparatus is started, or unexposed sheets 1, 1, . . . having different sizes may be loaded into the trays 71, 71, . . . at the sheet stacking section 70 before the operation of the apparatus is started. In order to select an erased sheet 1 having a size suitable for the sheet housing cassette 2' fed to the sheet housing cassette holding section 40 and take it out of the sheet stacking section 70, it is necessary to use a control means for controlling the selection and feeding-out of a sheet 1 having a size suitable for the sheet housing cassette 2' fed to the sheet housing cassette holding section 40. For this purpose, this embodiment is provided with a control section 90 disposed above the read-out section 20.

The sheet 1 conveyed toward the sheet housing cassette 2' is exposed to erasing light emitted by an erasing light source 81 at the auxiliary erasing section 80 since it may occur that the sheet 1 has been maintained for a long time at the sheet stacking section 70 and a long time has elapsed after the sheet 1 was subjected to erasing at the erasing section 30. Specifically, when at least a predetermined time elapses after erasing is conducted on the stimulable phosphor sheet 1, the sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the sheet 1 cause noise in a radiation image recorded next on the sheet 1. In order to prevent noise generation, the sheet 1 is passed over the auxiliary erasing section 80 for conducting erasing (i.e. secondary erasing) by releasing the radiation energy stored on the sheet 1 while the sheet 1 is maintained at the sheet stacking section 70. Therefore, the sheet 1 thus conveyed into the sheet housing cassette 2' may be taken out of the read-out apparatus in the form housed in the sheet housing cassette 2' and immediately used for image recording.

In the aforesaid embodiment, after the image-recorded sheet 1 is taken out of the sheet feed cassette 2, the same sheet feed cassette 2 is fed to the sheet housing cassette holding section 40 and utilized as the sheet housing cassette 2'. However, the sheet feed cassette 2 may be taken out of the read-out apparatus after the image-recorded sheet 1 is taken out of the sheet feed cassette 2, and a new empty cassette having an arbitrary size may be fed to the sheet housing cassette holding section 40.

Also, it is only necessary that the sheet stacking section 70 be capable of supporting a plurality of the sheets 1, 1, . . ., selecting a sheet 1 having a desired size from among the sheets 1, 1, . . . supported at the sheet stacking section 70, and feeding the selected sheet 1 out of the sheet stacking section 70. Therefore, the sheet stacking section may also have any configuration other than the configuration for stacking the sheets 1, 1, . . . in the trays 71, 71, . . . in accordance with the sheet sizes.

Figure 2:
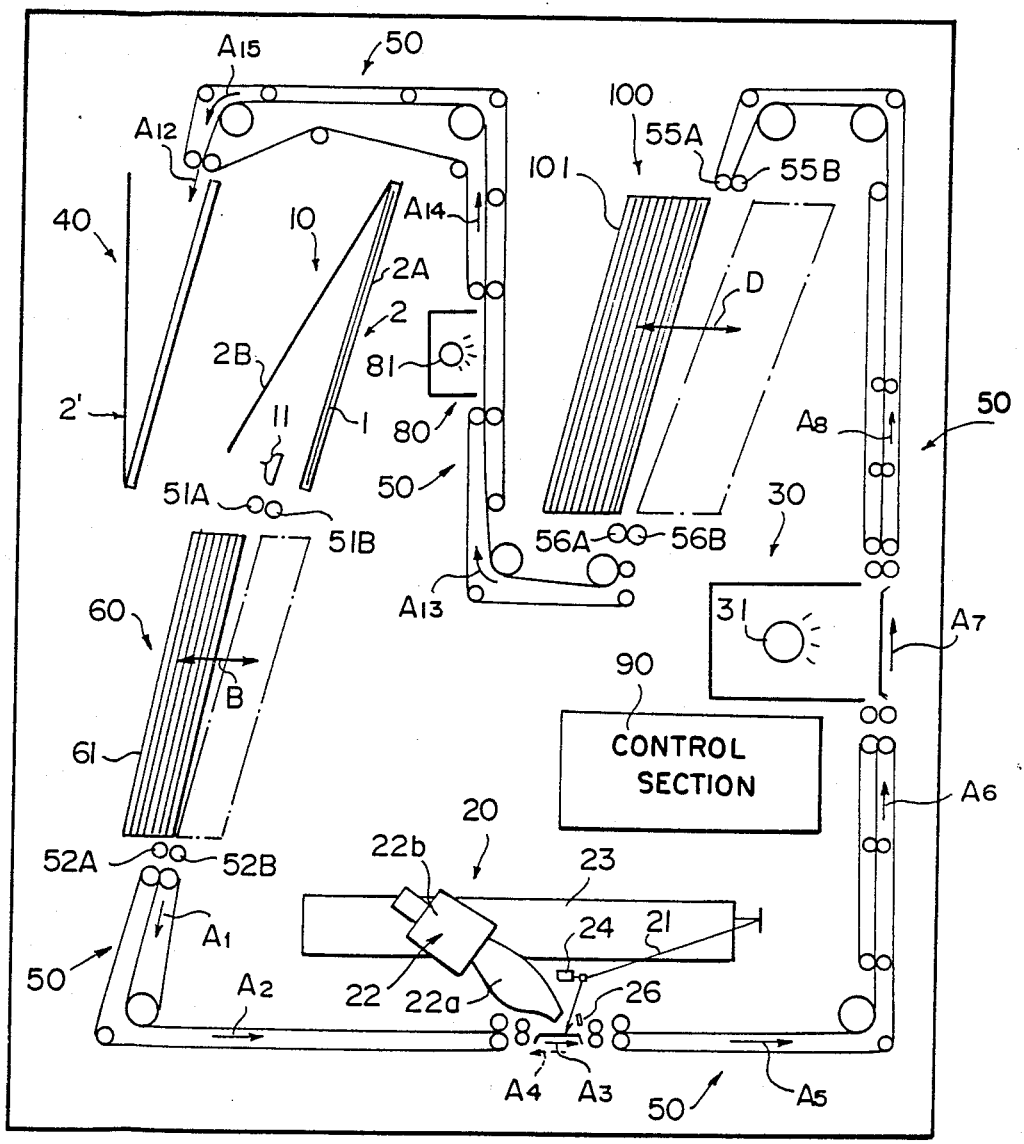
FIG. 2 is a schematic side view showing another embodiment of the radiation image read-out apparatus in accordance with the present invention.

Another embodiment of the radiation image read-out apparatus in accordance with the present invention provided with a sheet stacking section having a different configuration will hereinbelow be described with reference to FIGS. 2 to 5C. In FIG. 2, similar elements are numbered with the same reference numerals with respect to FIG. 1.

In the embodiment of FIG. 2, the image-recorded sheet 1 taken out of the sheet feed cassette 2 held at the sheet feed cassette holding section 10 is conveyed to the read-out section 20 and the erasing section 30 via the stacker 60. After image read-out and erasing are conducted on the sheet 1, the erased sheet 1 is conveyed by the sheet conveyance means 50 into a stacker 100 disposed as the sheet stacking section on the circulation path. The stackers 100 has the same configuration as the aforesaid stacker 60, and the configuration is shown in detail in FIGS. 3 to 6.

Figure 3:
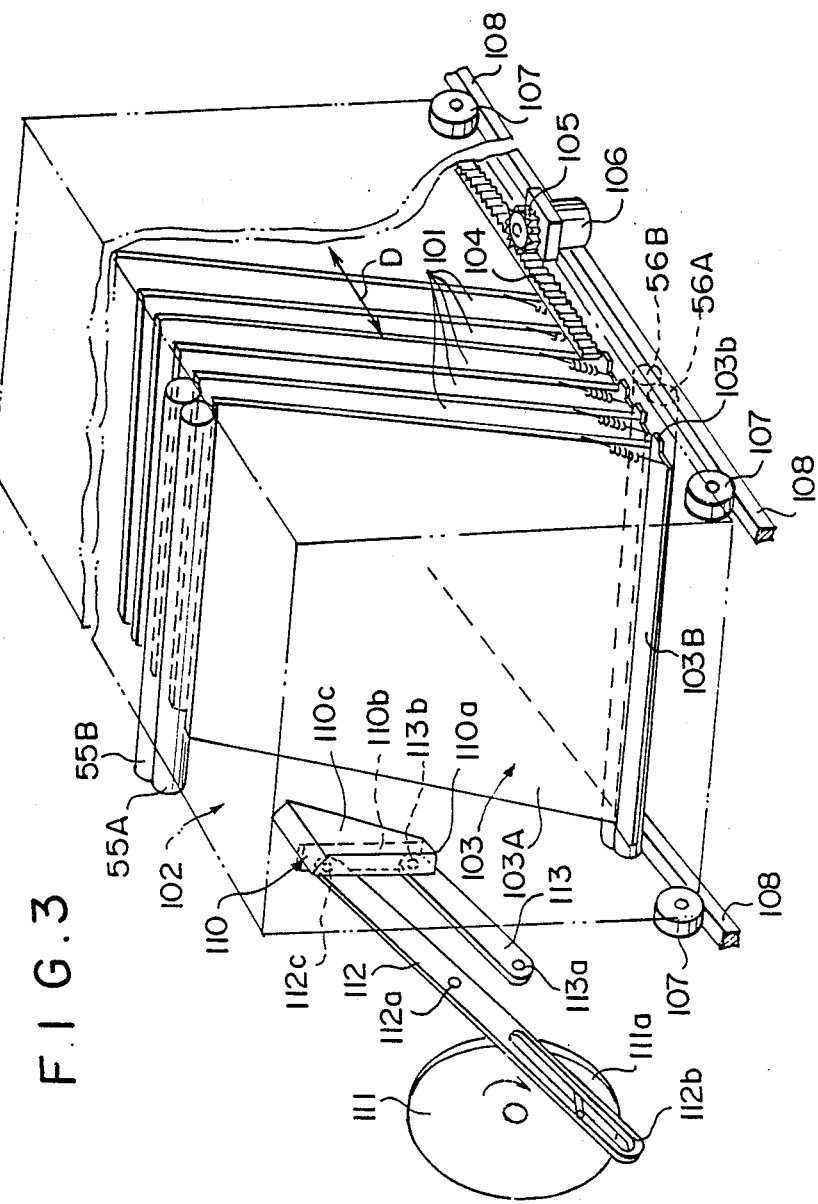
FIG. 3 is a perspective view showing the configuration of the stacker in the embodiment of FIG. 2.
Figure 4:
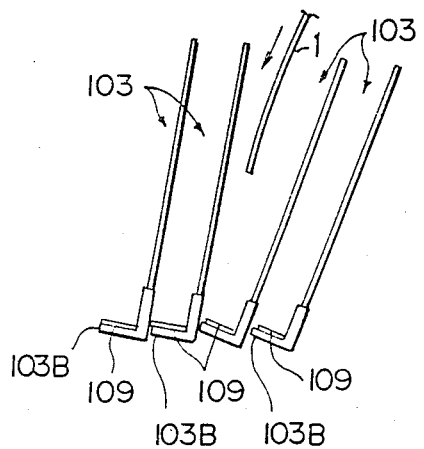
FIG. 4 is a side view showing the condition of the tray of the stacker at the time of sheet feed thereinto.
Figure 6:
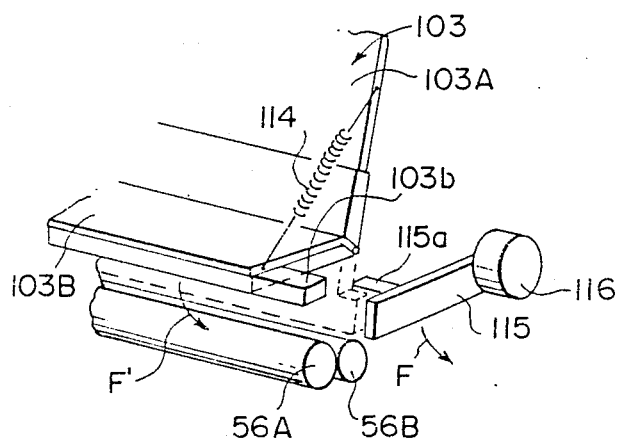
FIG. 6 is a perspective view showing the feed-out mechanism for feeding the stimulable phosphor sheet out of the second stacker.

As shown in FIG. 3, at the stacker 100, a plurality of the trays 103, 103, . . . for supporting a single sheet 1 respectively are disposed in equally spaced and parallel relation to each other in a case 102 constituted by four side walls. The trays 103, 103, . . . are inclined to face up obliquely. Each of the trays 103, 103, . . . is constituted by a supporting plate 103A and a bottom plate 103B approximately normal to the supporting plate 103A, and the space defined by the supporting plate 103A and the bottom plate 103B constitutes one sheet housing compartment 101. The left end portion of the supporting plate 103A is slanted so that the width of the supporting plate 103A becomes narrow towards the upper side, whereby the space between the trays 103, 103, . . ., may be increased by a guide member 110 as described in detail later. For moving the case 102 provided with the trays 103, 103, . . ., a pinion 105 is engaged with a rack 104 secured to one side wall of the case 102 and is rotated by a motor 106. As a result, wheels 107, 107, . . . provided at the lower end of the case 102 move along rails 108, 108 to move the case 102 in the direction as indicated by the arrow D. In FIG. 2, the positions of the sheet housing compartments 101, 101, . . . with the case 102 positioned at the leftmost side are shown, and the sheet housing compartments 101, 101, . . . are moveable in the form housed in the case 102 up to the position indicated by the chain line. As the case 102 is moved in the direction as indicated by the arrow D, a different tray 103 comes to a position under feed-in rollers 55A, 55B for feeding the sheet 1 into the stacker 100 as shown in FIGS. 2 and 3. The feed-in rollers 55A, 55B feed the sheet 1 into the tray 103 positioned thereunder. As shown in FIG. 4, when the sheet 1 leaves the feed-in rollers 55A, 55B, it falls along the supporting plate 103A of the tray 103 into the tray 103. A cushioning material 109 for absorbing the shock of the falling sheet 1 is secured to the upper surface of the bottom plate 103B of each tray 103. Also, as shown in FIG. 4, the inclination of the tray 103 for receiving the sheet 1 is changed so that the space between said tray 103 and the adjacent tray 103 is increased for facilitating the feeding of the sheet 1 into said tray 103. In order to deflect the tray 103 in this manner, the guide member 110 is provided on the lateral side of the case 102. The guide member 110 is in the form of a wedge having a thickness gradually increasing upwardly, and the lower end portion is chamfered to form a chamfered surface 110a. The guide member 110 contacts the slanted left end portion of the supporting plate 103A of the tray 103 for receiving the sheet 1, and is inserted into the sheet housing compartment 101 to widen the space thereof. Since sheets 1, 1, . . . having different sizes may be fed into the trays 103, 103, . . ., the guide member 110 also adjusts the position of the sheet 1 in the tray 103 in accordance with the size of the sheet 1 fed into the tray 103. The drive mechanism and the action of the guide member 110 will now be described with reference to FIGS. 3, 5A, 5B and 5C.

Figure 5A:
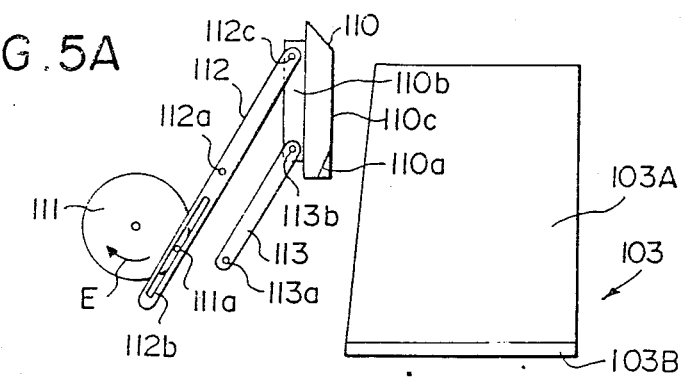
FIGS. 5A, 5B and 5C are explanatory views showing the function of the guide member at the stacker.
Figure 5B:
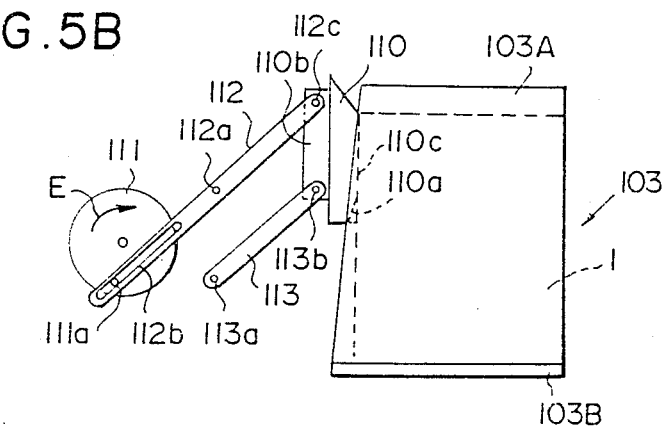
Figure 5C:
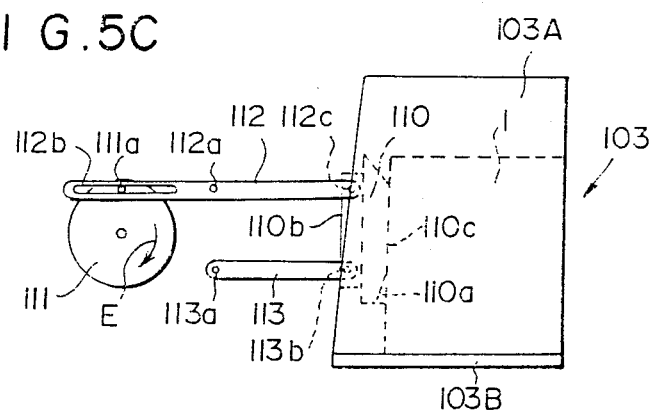

FIGS. 5A, 5B and 5C show the tray 103 and the guide member 110 as viewed from a direction parallel to the movement direction of the case 102 as indicated by the arrow D.

The guide member 110 is supported on a supporting member 110b. A swing arm 112 is rotatably supported at a center portion 112a, and has a long hole 112b provided at one end portion and engaged with a pin 111a secured to a rotatable plate 111. The other end 112c of the swing arm 112 is mounted on the upper portion of the supporting member 110b for the guide plate 110. A link member 13 is rotatably supported at one end portion 113a, and has the other end portion 113b mounted on the lower portion of the supporting member 110b. The rotatable plate 111 is rotated by a drive means (not shown) such as a motor in the direction as indicated by the arrow E. As shown in FIG. 5A, when the case 102 is moved as mentioned above, the guide member 110 is retracted from the tray 103. When the case 102 is stopped at the position for feeding the sheet 1 into the tray 103 and the tray 103 for receiving the sheet 1 is positioned on the lateral side of the guide member 110, the rotatable plate 111 is rotated clockwise, i.e. in the direction as indicated by the arrow E by a predetermined angle, so that the guide member 110 pushes the tray 103, widens the space of the sheet housing compartment 101, and advances up to the position shown in FIG. 5B. At the position shown in FIG. 5B, the guide member 110 pushes the tray 103 to widen the space between said tray 103 and a tray 103 adjacent thereto, thereby facilitating feed-in of the sheet 1, and to adjust the position of the feed-in sheet 1. Specifically, a side surface 110c of the guide member 110 contacts the side edge of the sheet 1 and adjusts the position of the sheet 1 in the width direction in accordance with the size of the sheet 1. In the case where the size of the sheet 1 is comparatively large, the guide member 110 is stopped at the position shown in FIG. 5B. As shown in FIG. 5C, in the case where the size of the sheet 1 introduced into the tray 103 is comparatively small, the guide member 110 advances more inwardly of the tray 103. While the space between the tray 103 and a tray 103 adjacent thereto is widened by the guide member 110, the sheet 1 is fed into said tray 103 by being guided along the side surface 110c of the guide member 110, and the position of the sheet 1 is adjusted by the guide member 110.

After the sheet 1 is fed into the tray 103, the rotatable plate 111 is rotated counter-clockwise to return the guide member 110 to the position shown in FIG. 5A, and the tray 103 fed with the sheet 1 is returned to the position parallel to the adjacent tray 103.

Feeding of the erased reusable sheet 1 into the stacker 100 is conducted in the manner as mentioned above. The sheets 1, 1, . . . housed in the respective trays 103, 103, . . . at the stacker 100 are selected one by one, fed out of the stacker 100, and introduced into the empty sheet housing cassette 2' held at the sheet housing cassette holding section 40. Conveyance of the sheet 1 into the sheet housing cassette 2' is conducted immediately after the sheet 1 suitable for the sheet housing cassette 2' is selected from the sheets 1, 1, . . . housed in the stacker 100 and the empty sheet housing cassette 2' is fed to the sheet housing cassette holding section 40. As shown in FIG. 2, a pair of feed-out rollers 56A, 56B are provided under the stacker 100 for receiving the sheet 1 ejected from the stacker 100 and feeding it out of the stacker 100. The case 102 is moved in the direction as indicated by the arrow D so that the tray 103 housing the selected sheet 1 comes to the position above the feed-out rollers 56A, 56B. Ejection of the sheet 1 from the stacker 100 after the case 102 is thus positioned will now be described with reference to FIG. 6.

The bottom plate 103B of the tray 103 is connected to the supporting plate 103A by a spring 114, and is normally at the position approximately perpendicular to the supporting plate 103A. A protrusion 103b is formed at the side end of the bottom plate 103B. A lever 115 provided with a protrusion 115a and rotatable in the direction as indicated by the arrow F by a drive means 116 constituted by a rotary solenoid or the like is disposed in the vicinity of the feed-out rollers 56A, 56B. When the sheet 1 is to be ejected from the tray 103, the protrusion 115a of the lever 115 is engaged with the protrusion 103b, and the lever 115 is rotated in the direction as indicated by the arrow F to extend the spring 114 and rotate the bottom plate 103B in the direction as indicated by the arrow F' up to the position lying approximately on the same plane as the supporting plate 103A as indicated by the broken line in FIG. 6. When the bottom plate 103B is rotated to said position, the sheet 1 falls by its weight out of the tray 103. The feed-out rollers 56A, 56B grasp the leading end of the falling sheet 1, and convey the sheet out of the stacker 100. When the conveyance of the sheet 1 out of the stacker 100 is finished, the lever 115 is returned to the position indicated by the solid line, and the bottom plate 103B is returned to the position indicated by the solid line by the returning force of the spring 114.

As shown in FIG. 2, the sheet 1 ejected from the stacker 100 is conveyed in the direction as indicated by the arrow A13, made to pass over an auxiliary erasing section 80 disposed in the conveyance path, and further conveyed in the directions as indicated by the arrows A14 and A15. The sheet 1 is then conveyed into the sheet housing cassette 2' held at the sheet housing cassette holding section 40.

In the case where the stacker 100 is utilized as the sheet stacking section as mentioned above, since the stacker 100 is smaller than the sheet stacking section comprising the trays, the read-out apparatus becomes compact as a whole. Also, in this case, it becomes possible to select an arbitrary sheet even from sheets having the same sizes and to send the sheet to the sheet housing cassette.

Figure 7:
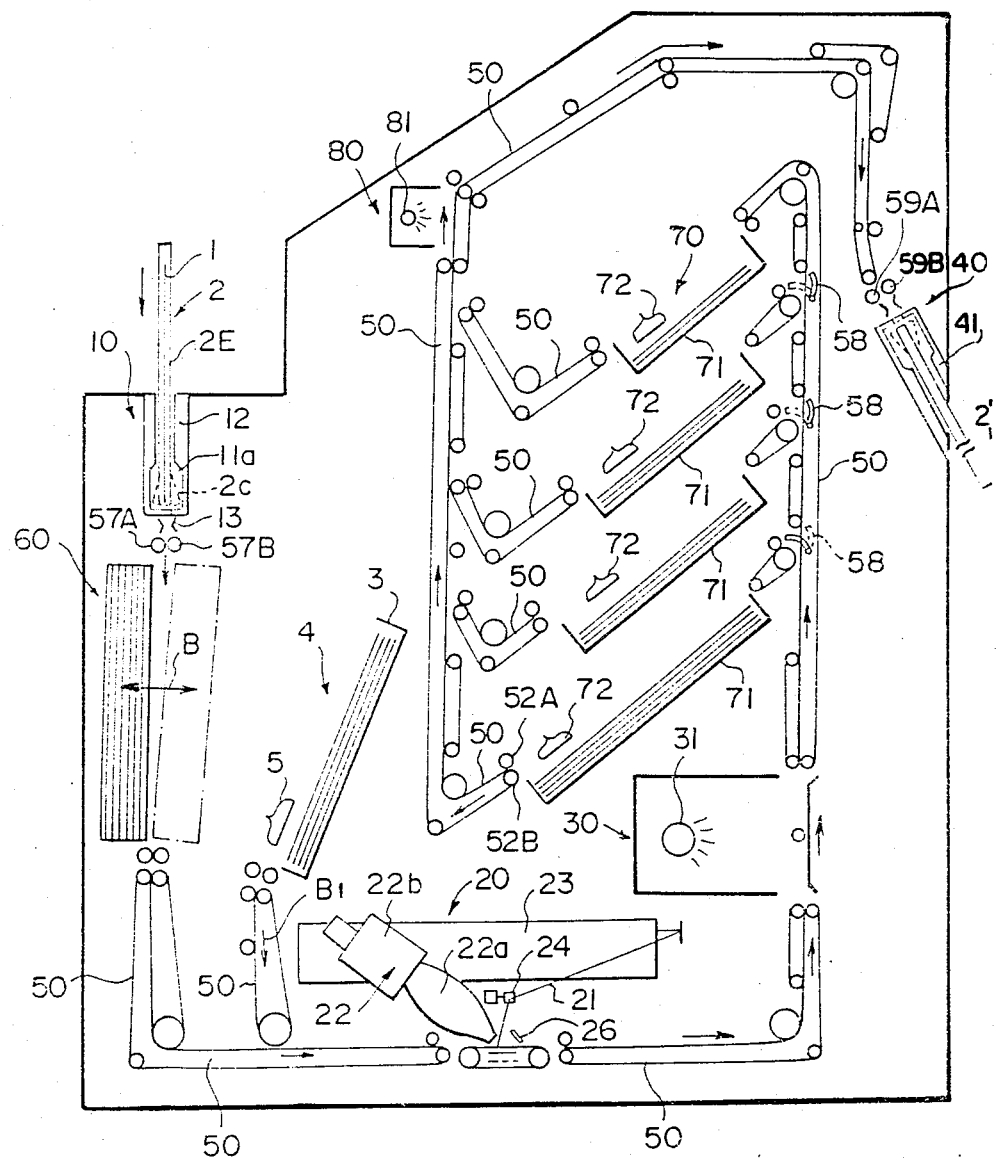
FIG. 7 is a schematic side view showing a further embodiment of the radiation image read-out apparatus in accordance with the present invention.

On the other hand, as shown in FIG. 7, the cassettes held at the sheet feed cassette holding section 10 and the sheet housing cassette holding section 40 may have such a configuration that the sheet 1 can be taken out of the cassette by utilizing sheet falling by the sheet weight. An embodiment of the radiation image read-out apparatus utilizing such cassettes will hereinbelow be described with reference to FIGS. 7, 8 and 9.

In FIG. 7, the sheet feed cassette 2 is fed perpendicularly to the horizontal plane into the sheet feed cassette holding section 10. The sheet feed cassette 2 comprises a cassette body 2E, and a cover member 2C formed at one end portion of the cassette body 2E for movement between a closed position for supporting the sheet 1 in the sheet feed cassette 2 as indicated by the solid line in FIG. 7 and an opened position for allowing the sheet 1 to fall from the sheet feed cassette 2 as indicated by the broken line in FIG. 7.

Figure 8:
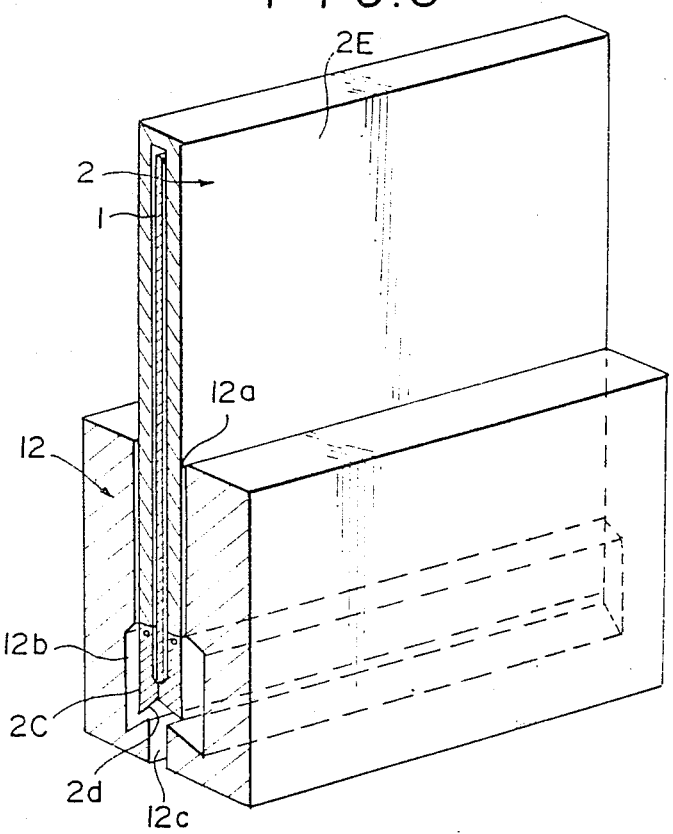
FIG. 8 is a perspective view, partly in cross section, showing the major portion of the sheet feed cassette holding section in the embodiment of FIG. 7.
Figure 9:
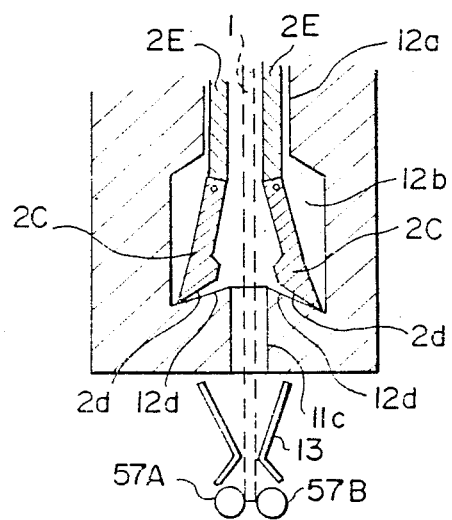
FIG. 9 is an explanatory sectional view showing the mechanism of opening of the sheet feed cassette at the sheet feed cassette holding section in the embodiment of FIG. 7.

As shown in FIG. 8, the sheet feed cassette 2 is inserted through a cassette insertion groove 12a into a cassette supporting base 12 at the sheet feed cassette holding section 10. A space 12b for allowing the cover member 2C of the sheet feed cassette 2 to move to its opened position is formed at a lower end portion of the cassette insertion groove 12a into which the cover member 2C enters. A slit 12c for allowing the sheet 1 to fall is formed below the space 12b. An inner wall surface at the end of the cassette supporting base 12 is slanted downwardly from the center, and the lower end 2d of the cover member 2C is also tapered. When the sheet feed cassette 2 is inserted deeply into the cassette supporting base 12, the tapered end 2d of the cover member 2C of the sheet feed cassette 2 contacts the slanted inner wall surface 12d at the end of the cassette supporting base 12. When the sheet feed cassette 2 is further inserted into the cassette supporting base 12, the tapered end 2d of the cover member 2C slides along the slanted inner wall surface 12d, and is flared outwardly to the opened position as shown in FIG. 9. When the cover member 2C is moved to its opened position, the sheet 1 falls by its weight out of the cassette body 2E, and is ejected out of the cassette supporting base 12 through the slit 12c. A pair of feed-in rollers 57A, 57B constituting a part of the sheet conveyance means 50 are disposed below the thus falling sheet 1. The sheet 1 falling by its weight is guided by guide plates 13, 13, the lower end portion of the sheet 1 is grasped between the feed-in rollers 57A, 57B, and the sheet 1 is conveyed in the direction as indicated by the arrow A1 in FIG. 7. The sheet 1 is further conveyed by the sheet conveyance means 50 to the read-out section 20 and the erasing section 30 for conducting image read-out and erasing, stacked at the sheet stacking section 70, and then conveyed into the sheet housing cassette 2' held at the sheet housing cassette holding section 40 via the auxiliary erasing section 80. The sheet housing cassette 2' has the same configuration as the sheet feed cassette 2, and is inserted into a cassette supporting base 41 at the sheet housing cassette holding section 40 obliquely upwardly until the upper end is opened. The erased reusable sheet 1 is conveyed by feed-in rollers 59A, 59B into the sheet housing cassette 2', and falls by the sheet weight into the sheet housing cassette 2' after leaving the feed-in rollers 59A, 59B.

In the case where the cassette having the configuration for allowing the sheet 1 to fall by its weight is used, the suction means for sucking up and taking the sheet 1 out of each cassette holding section becomes unnecessary, and the configuration of each cassette holding section is simplified. Also, since the space for movement of the suction means need not be provided and cassette opening/closing can be conducted in a comparatively small space, each cassette holding section becomes compact.

In the embodiment of FIG. 7, feeding of the sheets 1 into one of the trays 71, 71, . . . at the sheet stacking section 70 in accordance with the sheet size is conducted by use of guide plates 58, 58, . . . disposed near the feeding-in sides of the respective trays 71, 71, . . . other than the top tray 71. As shown for the guide plate 58 near the bottom tray 71 in FIG. 7, each of the guide plates 58, 58, . . . is rotatable between a first position for guiding the sheet 1 toward the tray 71 as indicated by the solid line in FIG. 7 and a second position for allowing the sheet 1 to be conveyed further upwardly as indicated by the broken line. The guide plate 58 near the tray 71 into which the sheet 1 is to be fed is selectively rotated to the first position in accordance with the size of the sheet 1 fed into the sheet stacking section 70.

On the other hand, in an external image recording apparatus, besides the image recording on the sheet 1 housed in the cassette, image recording may be conducted on a plurality of the sheets 1, 1, . . . taken one by one out of a sheet feed magazine for continuous image recording or the like. The sheets 1, 1, . . . carrying a radiation image stored thereon are sequentially housed in a sheet housing magazine, which is then sent to the read-out apparatus. The embodiment of the read-out apparatus shown in FIG. 7 is provided with a sheet housing magazine holding section 4 for releasably holding a sheet housing magazine 3 which houses a plurality of the sheets 1, 1, . . . carrying a radiation image stored thereon so that image read-out and erasing can be conducted also for the sheets 1, 1, . . . housed in the sheet housing magazine 3 which houses image-recorded sheets. Specifically, when the sheet housing magazine 3 is fed to the sheet housing magazine holding section 4, the sheets 1, 1, . . . are taken one by one out of the sheet housing magazine 3 by a suction means 5 disposed at the sheet housing magazine holding section 4. The sheet 1 thus taken out is conveyed by the sheet conveyance means 50 in the direction as indicated by the arrow B1, enters the conveyance system for the sheet taken out of the aforesaid sheet feed cassette 2 from midway of the sheet conveyance means 50, and is subjected to image read-out and erasing. After image read-out and erasing are finished for the sheet 1, the sheet 1 is fed into and stacked in the tray 71 at the sheet stacking section 70, and then taken out of the read-out apparatus via the auxiliary erasing section 80. The sheet housing cassette holding section 40 should preferably be constituted so that the sheet feed magazine can also be held thereby. In this case, it becomes possible to return the sheets 1, 1, . . ., which have been taken out of the sheet housing magazine 3 and subjected to image read-out and erasing, to the sheet feed magazine.

We claim:

1. A radiation image read-out apparatus comprising:
   (i) a read-out section for reading out a radiation image stored on a stimulable phosphor sheet,
   (ii) an erasing section for erasing radiation energy remaining on said stimulable phosphor sheet after image read-out from said stimulable phosphor sheet is finished,
   (iii) a sheet feed cassette holding section for releasably holding a sheet feed cassette capable of housing said stimulable phosphor sheet therein, and for taking said stimulable phosphor sheet out of said feed cassette,
   (iv) a sheet housing cassette holding section for releasably holding a sheet housing cassette capable of housing said stimulable phosphor sheet, wherein said sheet feed cassette holding section and said sheet housing cassette holding section are arranged adjacently such that sheet feed cassette and said sheet housing cassette are interchangeable,
   (v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and
   (vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section.

2. An apparatus as defined in claim 1 wherein said sheet conveyance means is provided with a stacker disposed between said sheet feed cassette holding section and said read-out section for temporarily housing said stimulable phosphor sheet conveyed out of said sheet feed cassette holding section.

3. An apparatus as defined in claim 2 wherein said stacker disposed between said sheet feed cassette holding section and said read-out section for temporarily housing said stimulable phosphor sheet conveyed out of said sheet feed cassette holding section comprises
   (a) a tray unit composed of a casing and a plurality of trays disposed in said casing for holding said stimulable phosphor sheets respectively in equally spaced and parallel relation to each other in a supported position,
   (b) a feed-in means provided above said tray unit for feeding said stimulable phosphor sheets fed by said sheet conveyance means into said tray unit,
   (c) a feed-out means provided under the tray unit for receiving the sheets discharged out of said tray unit and conveying the stimulable phosphor sheets into said sheet conveyance means, and
   (d) a moving means for moving said tray unit so that every tray in said casing can be brought under said feed-in means and above said feed-out means.

4. An apparatus as defined in claim 1 wherein said sheet stacking section comprises a plurality of trays for respectively housing a plurality of said stimulable phosphor sheets, and said sheet conveyance means is provided with a moveable conveyance device for moving to either one of said trays and conveying said stimulable phosphor sheet into said tray.

5. An apparatus as defined in claim 1 wherein said sheet stacking section comprises a plurality of trays for respectively housing a plurality of said stimulable phosphor sheets, and said sheet conveyance means in the vicinity of a feed-in side of each tray is provided with a guide plate rotatable between a first position for guiding said stimulable phosphor sheet towards said tray and a second position for allowing said stimulable phosphor sheet to be further conveyed up to a different one of said trays.

6. An apparatus as defined in claim 1 wherein said sheet stacking section comprises:
   (a) a tray unit composed of a casing and a plurality of trays disposed in said casing for holding said stimulable phosphor sheets respectively in equally spaced and parallel relation to each other in a supported position
   (b) a feed-in means provided above said tray unit for feeding said stimulable phosphor sheets fed by said sheet conveyance means into said tray unit,
   (c) a feed-out means provided under the tray unit for receiving the sheets discharged out of said tray unit and conveying the stimulable phosphor sheets into said sheet conveyance means, and
   (d) a moving means for moving said tray unit so that every tray in said casing can be brought under said feed-in means and above said feed-out means.

7. An apparatus as defined in claim 1 wherein said sheet conveyance means is provided with an auxiliary erasing section disposed between said sheet stacking section and said sheet housing cassette holding section.

8. An apparatus as defined in claim 1 further comprising a sheet feed magazine holding section for releasably holding a sheet housing magazine capable of housing a plurality of image-recorded stimulable phosphor sheets therein, and provided with a take-out means for taking said stimulable phosphor sheets one by one out of said sheet housing magazine.

9. A radiation image read-out apparatus comprising:
   (i) a read-out section for reading out a radiation image stored on a stimulable phosphor sheet,
   (ii) an erasing section for erasing radiation energy remaining on said stimulable phosphor sheet after image read-out from said stimulable phosphor sheet is finished,
   (iii) a sheet feed cassette holding section for releasably holding a sheet feed cassette capable of housing said stimulable phosphor sheet therein, and for taking said stimulable phosphor sheet out of said sheet feed cassette,
   (iv) a sheet housing cassette holding section for releasably holding a sheet housing cassette capable of housing said stimulable phosphor sheet,
   (v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and (vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section, wherein said sheet stacking section includes:

a tray unit composed of a casing and a plurality of trays disposed in said casing for holding said stimulable phosphor sheets respectively in equally spaced and parallel relation to each other in a supported position, a feed-in means provided above said tray unit for feeding said stimulable phosphor sheets fed by said sheet conveyance means into said tray unit, a feed-out means provided under the tray unit for receiving the sheets discharged out of said tray unit and conveying the stimulable phosphor sheets into said sheet conveyance means, a moving means for moving said tray unit so that every tray in said casing can be brought under said feed-in means and above said feed-out means, and a wedge-shaped guide member provided beside the tray located under said feed-in means and movable into said tray located under said feed-in means and moveable into said tray for changing the angle of inclination of the tray to enlarge the space between the tray and an adjacent tray to facilitate feed-in of the stimulable phosphor sheet.

10. An apparatus as defined in claim 9 wherein said wedge-shaped guide member is controlled in its depth of insertion into the tray in accordance with the size of the stimulable phosphor sheet fed into the tray for guiding and positioning the fed-in stimulable phosphor sheet in the lateral direction.

11. A radiation image read-out apparatus comprising:
(i) a read-out section for reading out a radiation image stored on a stimulable phosphor sheet,
(ii) an erasing section for erasing radiation energy remaining on said stimulable phosphor sheet after image read-out from said stimulable phosphor sheet is finished,
(iii) a sheet feed cassette holding section for releasably holding a sheet feed cassette capable of housing said stimulable phosphor sheet therein, and for taking said stimulable phosphor sheet out of said sheet feed cassette,
(iv) a sheet housing cassette holding section for releasably holding a sheet housing cassette capable of housing said stimulable phosphor sheet,
(v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and
(vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section, wherein said sheet stacking section includes:

a tray unit composed of a casing and a plurality of trays disposed in said casing for holding said stimulable phosphor sheets respectively in equally spaced and parallel relation to each other in a supported position, a feed-in means provided above said tray unit for feeding said stimulable phosphor sheets fed by said sheet conveyance means into said tray unit, a feed-out means provided under the tray unit for receiving the sheets discharged out of said tray unit and conveying the stimulable phosphor sheets into said sheet conveyance means, a moving means for moving said tray unit so that every tray in said casing can be brought under said feed-in means and above said feed-out means, and wherein each of said trays comprises a supporting plate for guiding said stimulable phosphor sheet fed-in by said feed-in means and supporting the fed-in stimulable phosphor sheet, and a bottom plate provided at the lower end of said supporting plate moveable between a first position to receive the lower end of said stimulable phosphor sheet and hold the stimulable phosphor sheet in the tray and a second position rotated downward from the first position to allow the stimulable phosphor sheet to fall by its weight and discharge it out of the tray unit.

12. A radiation image read-out apparatus comprising:
(i) a read-out section for reading out a radiation image stored on a stimulable phosphor sheet,
(ii) an erasing section for erasing radiation energy remaining on said stimulable phosphor sheet after image read-out from said stimulable phosphor sheet is finished,
(iii) a sheet feed cassette holding section for releasably holding a sheet feed cassette capable of housing said stimulable phosphor sheet therein, and for taking said stimulable phosphor sheet out of said sheet feed cassette,
(iv) a sheet housing cassette holding section for releasably holding a sheet housing cassette capable of housing said stimulable phosphor sheet,
(v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and
(vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section, wherein said sheet conveyance means is provided with a stacker disposed between said sheet feed cassette holding section and said read-out section for temporarily housing said stimulable phosphor sheet conveyed out of said sheet feed cassette holding section and wherein said stacker disposed between said sheet feed cassette holding section and said read-out section for temporarily housing said stimulable phosphor sheet conveyed out of said sheet feed cassette holding section includes;

a tray unit composed of a casing and a plurality of trays disposed in said casing for holding said stimulable phosphor sheets respectively in equally spaced and parallel relation to each other in a supported position, a feed-in means provided above said tray unit for feeding said stimulable phosphor sheets fed by said sheet conveyance means into said tray unit, a feed-out means provided under the tray unit for receiving the sheets discharged out of said tray unit and conveying the stimulable phosphor sheets into said sheet conveyance means, a moving means for moving said tray unit so that every tray in said casing can be brought under said feed-in means and above said feed-out means, and a wedge-shaped guide member provided beside the tray located under said feed-in means and moveable into said tray for changing the angle of inclination of the tray to enlarge the space between the tray and an adjacent tray to facilitate feed-in of the stimulable phosphor sheet.

13. An apparatus as defined in claim 12 wherein said wedge-shaped guide member is controlled of its depth of insertion into the tray in accordance with the size of the stimulable phosphor sheet fed into the tray for guiding and positioning the fed-in stimulable phosphor sheet in the lateral direction.

14. A radiation image read-out apparatus comprising:
(i) a read-out section for reading out a radiation image stored on a stimulable phosphor sheet,
(ii) an erasing section for erasing radiation energy remaining on said stimulable phosphor sheet after image read-out from said stimulable phosphor sheet is finished,
(iii) a sheet feed cassette holding section for releasably holding a sheet feed cassette capable of housing said stimulable phosphor sheet therein, and for taking said stimulable phosphor sheet out of said sheet feed cassette,
(iv) a sheet housing cassette holding section for releasably holding a sheet housing cassette capable of housing said stimulable phosphor sheet,
(v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and
(vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section, wherein said sheet conveyance means is provided with a stacker disposed between said sheet feed cassette holding section and said read-out section for temporarily housing said stimulable phosphor sheet conveyed out of said sheet feed cassette holding section and wherein said stacker disposed between said sheet feed cassette holding section and said read-out section for temporarily housing said stimulable phosphor sheet conveyed out of said sheet feed cassette holding section includes;

a tray unit composed of a casing and a plurality of trays disposed in said casing for holding said stimulable phosphor sheets respectively in equally spaced and parallel relation to each other in a supported position, a feed-in means provided above said tray unit for feeding said stimulable phosphor sheets fed by said sheet conveyance means into said tray unit, a feed-out means provided under the tray unit for receiving the sheets discharged out of said tray unit and conveying the stimulable phosphor sheets into said sheet conveyance means, a moving means for moving said tray unit so that every tray in said casing can be brought under said feed-in means and above said feed-out means, and wherein each of said trays comprises a supporting plate for guiding said stimulable phosphor sheet fed-in by said feed-in means and supporting the fed-in stimulable phosphor sheet, and a bottom plate provided at the lower end of said supporting plate moveable between a first position to receive the lower end of said stimulable phosphor sheet and hold the stimulable phosphor sheet in the tray and a second position rotated downward from the first position to allow the stimulable phosphor sheet to fall by its weight and discharge it out of the tray unit.

15. A radiation image read-out apparatus comprising:
(i) a read-out section for reading out a radiation image stored on a stimulable phosphor sheet,
(ii) an erasing section for erasing radiation energy remaining on said stimulable phosphor sheet after image read-out from said stimulable phosphor sheet is finished,
(iii) a sheet feed cassette holding section for releasably holding a sheet feed cassette capable of housing said stimulable phosphor sheet therein, and for taking said stimulable phosphor sheet out of said sheet feed cassette,
(iv) a sheet housing cassette holding section for releasably holding a sheet housing cassette capable of housing said stimulable phosphor sheet, wherein said sheet feed cassette holding section and said sheet housing cassette holding section are arranged adjacently such that sheet feed cassette and said sheet housing cassette are interchangeable,
(v) a sheet stacking section for holding a plurality of the stimulable phosphor sheets having different sizes, selecting said stimulable phosphor sheet having a desired size one at a time from among said stimulable phosphor sheets held at said sheet stacking section, and feeding out said selected stimulable phosphor sheet, and
(vi) a sheet conveyance means for receiving said stimulable phosphor sheet taken out of said sheet feed cassette held at said sheet feed cassette holding section, conveying said stimulable phosphor sheet to said read-out section and said erasing section, thereafter conveying said stimulable phosphor sheet to said sheet stacking section, and conveying said stimulable phosphor sheet fed out of said sheet stacking section into said sheet housing cassette held at said sheet housing cassette holding section, wherein said sheet feed cassette comprises a cassette body, and a cover member which is opened by a cassette supporting base at said sheet feed cassette holding section and allows said stimulable phosphor sheet housed therein to fall by the sheet weight out of said sheet feed cassette when said sheet feed cassette is inserted into a cassette insertion groove in said cassette supporting base.

* * * * *